Patented June 4, 1946

2,401,304

UNITED STATES PATENT OFFICE 2,401,304

PRODUCTION OF CELLULOSE DERIVATIVES

John Edward Jones, Spondon, near Derby, England, assignor to British Celanese Limited, London, England, a company of Great Britain No Drawing. Application December 16, 1942, Serial No. 469,219. In Great Britain December 30, 1941

11 Claims. (Cl. 260—230)

This invention is concerned with improvements in the production of cellulose derivatives, particularly organic acid esters of cellulose.

The usual method for the production of organic acid esters of cellulose consists in esterifying cellulose with the apropriate organic acid anhydride in the presence of sulphuric acid as catalyst and of a liquid which is a solvent for the cellulose ester produced. Esterification is usually continued until what is known as a "promary" ester, which contains approximately three ester radicles per $C_6H_{10}O_5$ unit, is obtained, and this ester is generally then subjected to a ripening operation which splits off some of the ester groups and produces a "secondary" cellulose ester having different solubility properties from those of the primary ester. This ripening operation is usually effected by adding to the esterification solution sufficient water to destroy residual acid anhydride and provide a certain excess and then allowing the solution to stand until the desired degree of ripening has been effected.

It has now been discovered that the ripening operation is facilitated by carrying it out in the presence of an aromatic hydroxy compound which is a solvent for the primary ester. Particularly suitable compounds of this character are phenol and the cresols.

The process of the present invention may be employed in the production of cellulose acetate, propionate, butyrate and other organic acid esters of cellulose using, for example, 10–20% of sulphuric acid, based on the weight of the cellulose, as catalyst. It is, however, of particular value in the production of cellulose acetate and other lower fatty acid esters by mild esterification processes using, for example, from 1–5% of sulphuric acid as catalyst or using mild catalysts, such as zinc chloride and hydrochloric acid. It is frequently found that if an attempt is made to ripen the primary ester, prepared by such a process, in the usual manner by the addition of water or dilute acetic acid to the primary esterification solution, the whole solution gels and becomes almost unmanageable. If, however, ripening is effected by the process of the present invention, gelling may be avoided and a product of high clarity may be produced.

The production of cellulose acetate according to the process of the present invention may be effected by acetylating cotton linters, wood pulp or other cellulosic material with acetic anhydride in a medium comprising acetic acid, using sulphuric acid, zinc chloride, ferric chloride or stannic chloride as catalyst. The use of aromatic hydroxy compounds in ripening operations is particularly valuable in the production of high viscosity cellulose acetate using acetic acid in an amount equal to at least six times the weight of the cellulose, as is described e. g. in prior U. S. Patent No. 1,708,787. On completion of acetylation, it is preferable first to mix with the acetylation solution the required amount of aromatic hydroxy compound, e. g. an amount equal to 20–40% of the solution, and then to mix water with the solution in an amount sufficient to destroy any excess acetic anhydride and provide sufficient for the ripening operation. The proportion of water used for ripening may, for example be 20, 40 or 60% or more based on the weight of the cellulose. Usually the higher the proportion of water employed, the higher is the viscosity of the acetate obtained. After incorporation of the water, together with additional catalyst if required, the acetate may be ripened at a temperature between 20 and 30° C. until the desired solubility properties have been obtained. It may then be precipitated by mixing the solution with dilute acetic acid and the precipitated acetate separated and stabilised in the ordinary manner.

Other cellulose esters may be produced in a similar manner.

Cellulose esters which have been produced by esterification in suspension may also be ripened in accordance with the process of the present invention by dissolving them in a suitable solvent and carrying out the ripening operation as described above in the presence of a suitable aromatic hydroxy compound.

The following is an example of the production of cellulose acetate by the process of the present invention:

Example 100 parts by weight of cellulose are pretreated with a mixture containing 400 parts of acetic acid, 50 parts of acetic anhydride and .5 part of sulphuric acid, pretreatment being effected for about two hours at 25–30° C. A mixture containing 200 parts of acetic acid, 300 parts acetic anhydride and 1.5 parts sulphuric acid is then added and the mass is kept at a temperature of about 50° C. for about two hours until a good dope has been produced. 300 parts of molten phenol are then added after which sufficient water containing sulphuric acid is incorporated to destroy excess acetic anhydride and give a mixture containing 40 parts of water and 10 parts of sulphuric acid. Ripening is then effected at a temperature of about 30° C. for 40-50 hours until an acetone-soluble acetate having a desired acetyl content is produced. Ripening is effected easily and a product of good clarity is produced, whereas in the absence of the phenol difficulty is experienced with ripening and the clarity of the cellulose acetate produced is very much lower.

Having described my invention what I desire to secure by Letters Patent is:

1. In the production of organic acid esters of cellulose, ripening the primary ester produced while it is in solution in an acidic ripening medium comprising water and a phenolic hydroxy compound which is a solvent for the primary ester.

2. Process for the production of cellulose acetate which comprises acetlylating cellulose with acetic anhydride in a medium comprising glacial acetic acid in amount at least six times the weight of the cellulose and an acetylation catalyst, incorporating with the primary acetylation solution a phenolic compound which is a solvent for the primary acetate and ripening the acetate while it is in solution in an acidic ripening medium, the amount of the phenolic compound being sufficient to keep the acetate in solution throughout the ripening operation.

3. Process for the production of organic acid esters of cellulose which comprises esterifying cellulose with an organic acid anhydride in a liquid medium which is a solvent for the primary ester formed and ripening the primary ester while it is in solution in an acidic ripening medium comprising water and phenol.

4. Process for the production of organic acid esters of cellulose which comprises esterifying cellulose with an organic acid anhydride in a liquid medium which is a solvent for the primary ester formed and ripening the primary ester while it is in solution in an acidic ripening medium comprising water and a cresol.

5. Process for the production of cellulose acetate which comprises acetylating cellulose with acetic anhydride in a medium comprising glacial acetic acid and sulphuric acid as catalyst, incorporating phenol with the primary acetylation solution and ripening the acetate while it is in solution in an acidic ripening medium, the amount of phenol being sufficient to keep the acetate in solution throughout the ripening operation.

6. Process for the production of cellulose acetate which comprises acetylating cellulose with acetic anhydride in a medium comprising glacial acetic acid and sulphuric acid as catalyst, incorporating a cresol with the primary acetylation solution and ripening the acetate while it is in solution in an acidic ripening medium, the amount of cresol being sufficient to keep the acetate in solution throughout the ripening operation.

7. Process for the production of organic acid esters of cellulose which comprises esterifying cellulose with an organic acid anhydride in a liquid medium which is a solvent for the primary ester formed and in the presence of sulphuric acid in amount at most 2% of the weight of the cellulose, and ripening the primary ester while it is in solution in an acidic ripening medium comprising water and a phenolic compound which is a solvent for the primary ester.

8. Process for the production of cellulose acetate which comprises acetylating cellulose with acetic anhydride in a medium comprising glacial acetic acid and sulphuric acid in amount at most 2% of the weight of the cellulose, incorporating with the primary acetylation solution a phenolic compound which is a solvent for the primary acetate and ripening the acetate while it is in solution in an acidic ripening medium, the amount of the phenolic compound being sufficient to keep the acetate in solution throughout the ripening operation.

9. Process for the production of cellulose acetate which comprises acetylating cellulose with acetic anhydride in a medium comprising glacial acetic acid in amount at least six times the weight of the cellulose and sulphuric acid in amount at most 2% of the weight of the cellulose, incorporating phenol with the primary acetylation solution and ripening the acetate while it is in solution in an acidic ripening medium, the amount of phenol being sufficient to keep the acetate in solution throughout the ripening operation.

10. Process for the production of cellulose acetate which comprises acetylating cellulose with acetic anhydride in a medium comprising glacial acetic acid in amount at least six times the weight of the cellulose and sulphuric acid in amount at most 2% of the weight of the cellulose, incorporating a cresol with the primary acetylation solution and ripening the acetate while it is in solution in an acidic ripening medium, the amount of cresol being sufficient to keep the acetate in solution throughout the ripening operation.

11. Process for the production of organic acid esters of cellulose, which comprises esterifying cellulose with an organic acid anhydride in a liquid medium which is a solvent for the primary ester formed and ripening the primary ester while it is in solution in an acidic ripening medium comprising water and a phenolic hydroxy compound.

JOHN EDWARD JONES.